Figure 1:
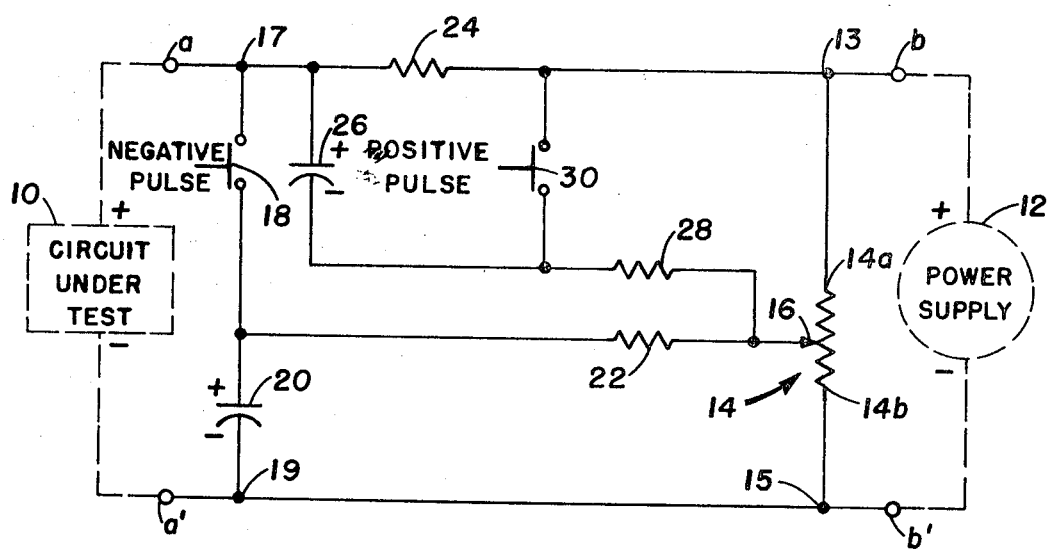

United States Patent
Hoffman

[15] 3,657,555
[45] Apr. 18, 1972

[54] VARIABLE PASSIVE VOLTAGE TRANSIENT GENERATOR

[72] Inventor: Eric J. Hoffman, Baltimore, Md.
[73] Assignee: The United States of America as represented by the Secretary of the Navy
[22] Filed: Mar. 27, 1970
[21] Appl. No.: 23,161

[52] U.S. Cl. ............................307/108, 324/158, 333/20
[51] Int. Cl. ............................H03k 3/53, H03k 3/00
[58] Field of Search ............324/57, 158; 333/20; 307/108

[56] References Cited

UNITED STATES PATENTS

| 3,039,057 | 6/1962 | Conners | 324/158 |
| 3,260,934 | 7/1966 | Lion | 324/57 |
| 3,179,881 | 4/1965 | Ichiyo | 324/57 |
| 2,544,685 | 3/1951 | Jackson | 324/57 |
| 2,408,727 | 10/1946 | Blitz | 324/57 |
| 3,403,333 | 9/1968 | Wooten | 324/57 |

Primary Examiner—Herman Karl Saalbach
Assistant Examiner—C. Baraff
Attorney—Richard S. Sciascia and J. A. Cooke

[57] ABSTRACT

A passive generator that provides for the precise and repeatable generation of voltage transients. A portion of the supply voltage, as determined by a potentiometer, is applied to a first and second capacitor-resistor network. By closing associated first and second switches, the generation of either positive or negative voltage transients, having a variable amplitude and a definite time constant is accomplished.

8 Claims, 2 Drawing Figures

VARIABLE PASSIVE VOLTAGE TRANSIENT GENERATOR

BACKGROUND OF THE INVENTION

This invention relates to voltage transient generation and more particularly to apparatus for generating precise, variable, and repeatable voltage transients.

Voltage transients on a power bus frequently can disrupt circuit operation by falsely triggering flip-flops, firing one-shots or appearing at amplifier outputs. It is necessary therefore to determine the immunity of an associated circuit to such voltage transients. In the past, this has been accomplished by approximate and imprecise methods. Additionally, prior art methods and devices have not provided for variable amplitude in the generation of voltage transients. For example, the usual circuits for generating voltage transients in the past were mainly dependent upon applying a charge to a capacitor, a transient voltage being produced upon said capacitor's discharge. However, the main disadvantage of capacitive discharge transient generation was that the amplitude could not be directly controlled.

It is therefore an object of the instant invention to provide a voltage transient generator that can be utilized to test the noise immunity of a circuit under test.

It is another object of the invention to provide a voltage transient generator that will produce precise and exact voltage transients.

Another object of the subject invention is to provide a voltage transient generator that, does not require a power supply of its own.

A further object of the invention is to provide a voltage transient generator having a variable amplitude output.

Still another object of the invention is to provide a voltage transient generator that will produce both negative and positive voltage transients.

And it is still another object of the instant invention to provide a voltage transient generator that can be produced in a simple and inexpensive manner.

Figure 2:
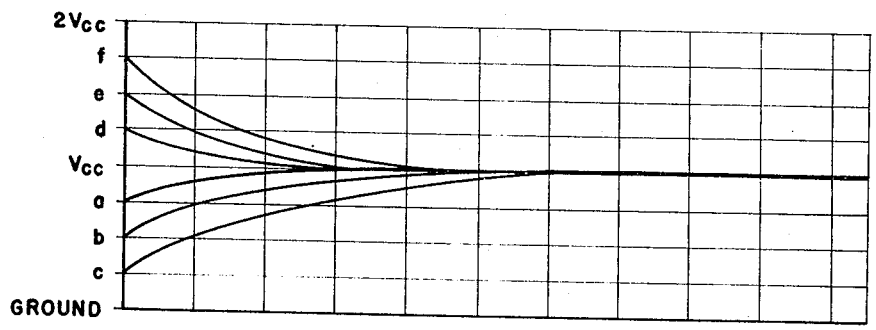

These and other objects of the subject invention, as well as many of the attendant advantages thereof, will become more readily discernible when reference is made to the following detailed description in conjunction with the drawings, in which:

FIG. 1 is a schematic view illustrating a preferred embodiment of the subject invention; and FIG. 2 is a graphical presentation of various outputs of the circuit of FIG. 1.

Referring now to FIG. 1, a circuit under test 10, is connected between terminals $a$ and $a'$. A power supply 12, connected between terminals $b$ and $b'$, provides a voltage source for the instant invention and for the circuit 10. Connected in parallel across the power supply 12, between terminals 13 and 15, is a potentiometer 14 having end terminals 14a and 14b and a wiper arm 16. Connected in parallel across the circuit under test 10 are serially connected negative pulse switch 18, connected to terminal $a$ through a connection 17, and capacitor 20 connected to terminal $a'$ through a connection 19. A resistor 22 is connected at one end to a junction between the negative pulse switch 18 and the capacitor 20 and at the other end to the wiper arm 16 of potentiometer 14. Connected between the terminals 13 and 17 is a resistor 24. An RC circuit comprising a capacitor 26 and a resistor 28 is connected at the capacitor 26 end to the junction of the resistor 24 and the connection 17, and connected at the resistor 28 end to the junction of the resistor 22 and the wiper arm 16 of the potentiometer 14. Completing the circuit is a positive pulse switch 30 that is connected at one side to the junction of the connection 13 and the resistor 24 and at the other side to the junction of the capacitor 26 and the resistor 28.

Referring now to the operation of the subject invention, potentiometer 14 places a fraction, $\alpha$, of the supply voltage, $V_{cc}$, of power supply 12, via the wiper arm 16, on the positive terminal of the capacitor 20 and on the negative terminal of the capacitor 26. The value of $\alpha$ is directly determined by the position of the wiper arm 16 of potentiometer. The importance of the relationship, discussed in greater detail hereinafter, is that the amplitude of the generated voltage transients is proportional to the value of $(1-\alpha)$. Therefore, to obtain a larger magnitude of voltage transience, a smaller fraction of $\alpha$ is selected from potentiometer 14. Thus, it can easily be seen that the voltage across capacitor 20, namely $V_{c20}$, equals $\alpha V_{cc}$. Concurrently, the voltage across capacitor 26, namely $V_{c26}$, equals $V_{cc}(1-\alpha)$. Closing of the negative pulse switch 18 thereby produces a negative transient of amplitude $$V_{cc} - \alpha V_{cc}$$

which is equal to $$V_{cc}(1-\alpha).$$

The time constant of the negative transient can be expressed by $$\tau_{neg} = R_{24} C_{20}$$

To explain further, the wiper arm 16 of potentiometer 14 will be set so as to produce $\alpha = \frac{3}{4}$. In this condition the voltage at the positive terminal of capacitor 20 is $\frac{3}{4} V_{cc}$. Accordingly, the generated voltage transient will have an amplitude of:

$$V_{cc}(1-\frac{3}{4}) = \frac{1}{4} V_{cc}$$

This condition is shown by waveform $a$ of FIG. 2. Waveform $b$ refers to the condition $\alpha = \frac{1}{2}$; and waveform $c$ refers to $\alpha = \frac{1}{4}$. Typical component values for the production of negative pulses would be:

Capacitor 20 = 10 μf, 50v
Resistor 22 = 3.3 KΩ
Potentiometer 14 = 10 KΩ
Resistor 24 = 10 Ω

In a similar manner, closing the positive pulse switch 30 produces a positive transient of amplitude $$V_{c26} = V_{cc}(1-\alpha)$$

The time constant of the positive transient can be expressed by:

$$\tau_{pos} = R_{24} C_{26}$$

Referring again to the first example mentioned hereinabove, waveform $d$ is produced when $\alpha = \frac{3}{4}$. In this condition the potential on the negative side of capacitor 26 is $\frac{3}{4}\alpha$. Due to the negligible voltage drop across resistor 24, the voltage at the positive side of capacitor 26 is approximately 4/4 $V_{cc}$, thus providing a voltage drop of $\frac{1}{4}\alpha$ across capacitor 26. Closing of positive pulse switch 30 produces a positive transient exceeding $V_{cc}$ by the magnitude of $\frac{1}{4}\alpha$. Thus, waveform $d$ is shown having an amplitude of 5/4 $V_{cc}$. Similarly, waveform $e$ corresponds to an $\alpha = \frac{1}{2}$; waveform $f$, to an $\alpha = \frac{1}{4}$. Typical component values for the production of positive pulses would be:

Resistor 28 = 3.3 KΩ
Capacitor 26 = 10 μf, 50v
Resistor 24 = 10 Ω

Since $0 \leq \alpha \leq 1$, the amplitude of the generated transients can be continuously and precisely varied from 0 to 100 percent of $V_{cc}$.

Resistors 28 and 22 isolate capacitors 26 and 20, respectively, during a switch closure. Resistor 24 has been chosen small enough so that the voltage drop across it, due to the steady-state current of the circuit under test 10, can be ignored. Switches 18 and 30 should be of the "no-bounce" type, as commonly referred to in the art.

In summary a voltage transient generator, drawing its operating power from the circuit under test can precisely and repeatedly produce either positive or negative voltage transients of variable amplitude merely upon the "push of a button."

I claim:

1. A variable passive voltage transient generator for applying variable amplitude positive and negative voltage transients to a circuit under test, comprising:

a voltage source connected in parallel to said variable voltage transient generator and to said circuit under test, said voltage source having an output voltage $V_{cc}$;

variable resistor means connected across said voltage source for selecting a voltage fraction, $(1-\alpha) V_{cc}$, from said voltage source;

first voltage storage means connected in electrical parallelism across said variable resistor means whereby discharge of said first voltage storage means produces a positive voltage transient having a positive amplitude proportional to $(1-\alpha) V_{cc}$; and second voltage storage means connected in electrical parallelism across said first voltage storage means whereby discharge of said second voltage storage means produces a negative voltage transient having an amplitude equal to the amplitude of the positive voltage transient as produced by the discharge of said first voltage storage means, said amplitude of said negative voltage transient being proportional to $(1-\alpha) V_{cc}$.

2. The variable passive voltage transient generator as recited in claim 1 wherein said first and second voltage storage means are first and second capacitors, each of which has a first plate for applying a positive charge thereon and a second plate for applying a negative charge thereon.

3. The variable passive voltage transient generator as recited in claim 2, and further comprising means for discharging said first and second capacitors.

4. The variable passive voltage transient generator as recited in claim 3, wherein said discharging means comprises:

a first switch connected in electrical parallelism with said first capacitor means whereby closure of said first switch will produce a positive voltage transient having an amplitude proportional to $(1-\alpha) V_{cc}$, and a second switch serially connected with said second capacitor means whereby closure of said second switch will produce a negative voltage transient having an amplitude proportional to $(1-\alpha) V_{cc}$.

5. The variable passive voltage transient generator as recited in claim 4, wherein said variable resistor means is a potentiometer having a pair of end terminals connected across said voltage source and further having a wiper arm connected to said first plate of said second capacitor and to said second plate of said first capacitor whereby variation of the resistance value of said potentiometer will produce a proportional change in the amplitude of said positive and negative voltage transients.

6. The variable passive voltage transient generator as recited in claim 5, and further comprising means serially connected between said wiper arm of said potentiometer and said second plate of said first capacitor for isolating said first capacitor during the closure of said first switch.

7. The variable passive voltage transient generator as recited in claim 6, and further comprising means serially connected between said wiper arm of said potentiometer and said first plate of said second capacitor for isolating said second capacitor during the closure of said second switch.

8. The variable passive voltage transient generator as recited in claim 7, wherein said isolating means is a resistor.

* * * * *